(12) United States Patent
Heshami et al.

(10) Patent No.: US 12,481,903 B2
(45) Date of Patent: Nov. 25, 2025

(54) RYDBERG EXCITON QUANTUM SIMULATOR

(71) Applicant: National Research Council of Canada, Ottawa (CA)

(72) Inventors: Khabat Heshami, Ottawa (CA); Jacob Taylor, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 967 days.

(21) Appl. No.: 17/626,275

(22) PCT Filed: Jul. 10, 2020

(86) PCT No.: PCT/CA2020/050960
§ 371 (c)(1),
(2) Date: Jan. 11, 2022

(87) PCT Pub. No.: WO2021/003580
PCT Pub. Date: Jan. 14, 2021

(65) Prior Publication Data
US 2022/0292382 A1 Sep. 15, 2022

Related U.S. Application Data

(60) Provisional application No. 62/872,959, filed on Jul. 11, 2019.

(51) Int. Cl.
*G06N 10/20* (2022.01)
(52) U.S. Cl.
CPC .................................. *G06N 10/20* (2022.01)
(58) Field of Classification Search
CPC .................................................... G06N 10/20
See application file for complete search history.

(56) References Cited

U.S. PATENT DOCUMENTS 5,244,870 A * 9/1993 Masumi ............... H10N 60/128
505/181
11,586,968 B2 * 2/2023 King ..................... G06N 10/40
(Continued)

FOREIGN PATENT DOCUMENTS

WO 2019/014589 A1 1/2019

OTHER PUBLICATIONS

Lynch et al., Giant Rydberg Excitons in Synthetic and Artificial Cuprous Oxide, International Conference on Transparent Optical Networks 2018, IEEE) (Year: 2018).*
(Continued)

*Primary Examiner* — Hugh Maupin
(74) *Attorney, Agent, or Firm* — Aird & McBurney LP (57) ABSTRACT

A quantum simulation method for solving a computational problem using a solid-state quantum system, the method comprising the steps of: passing a laser through a material; in the material, evolving at least some of a plurality of atoms in a first state into at least some of a plurality of atoms in a second state upon receiving energy from the laser to form at least one exciton; selecting at least one exciton site on the material wherein the at least one exciton site is separated from a neighbouring at least one exciton site by a distance less than a Rydberg blockade radius; mapping the computational problem into a problem Hamiltonian of the solid-state quantum system; measuring at least a portion of plurality of the at least one excitons to obtain a read-out of the solid-state quantum system; and determining a solution to the computational problem from the read-out.

26 Claims, 6 Drawing Sheets

(56) References Cited

U.S. PATENT DOCUMENTS

| | | | |
|---|---|---|---|
| 2018/0292786 A1 | 10/2018 | Sakai et al. | |
| 2018/0373118 A1* | 12/2018 | Kiffner | G02F 1/353 |
| 2020/0161446 A1* | 5/2020 | Anderson | B82Y 20/00 |
| 2020/0185120 A1* | 6/2020 | Keesling Contreras | G21K 1/093 |
| 2020/0272910 A1* | 8/2020 | Kapit | G06N 10/60 |
| 2020/0356890 A1* | 11/2020 | Ashrafi | H10N 99/05 |
| 2021/0279631 A1* | 9/2021 | Pichler | G06N 10/00 |

OTHER PUBLICATIONS

Bernien, Hannes, et al. "Probing many-body dynamics on a 51-atom quantum simulator." Nature 551.7682 (2017): 579-584.

Pichler, Hannes, et al. "Quantum optimization for maximum independent set using Rydberg atom arrays." arXiv:1808.10816 (2018).

Dirac, Paul Adrien Maurice. "Quantum mechanics of many-electron systems." Proceedings of the Royal Society of London. Series A, Containing Papers of a Mathematical and Physical Character 123. 792 (1929): 714-733.

O'Malley, Peter JJ, et al. "Scalable quantum simulation of molecular energies." Physical Review X 6.3 (2016): 031007.

Khazali, Mohammadsadegh, et al. "Single-photon source based on Rydberg exciton blockade." Journal of Physics B: Atomic, Molecular and Optical Physics 50.21 (2017): 215301.

He, Jiangang, et al. "Stacking effects on the electronic and optical properties of bilayer transition metal dichalcogenides $MoS_2$, $MoSe_2$, $WS_2$, and $WSe_2$." Physical Review B 89.7 (2014): 075409.

Maultzsch, J., et al. "Exciton binding energies in carbon nanotubes from two-photon photoluminescence." Physical Review B 72.24 (2005): 241402.

Grünwald, P., et al. "Signatures of quantum coherences in Rydberg excitons." Physical Review Letters 117.13 (2016): 133003.

Kazimierczuk, Tomasz, et al. "Giant Rydberg excitons in the copper oxide $Cu_2O$." Nature 514.7522 (2014): 343-347.

Kazimierczuk, Tomasz, et al. Supplementary Information for "Giant Rydberg excitons in cuprous oxide." (2020): 1-9. https://doi.org/10.1038/nature13832.

Keesling, Alexander, et al. "Quantum Kibble-Zurek mechanism and critical dynamics on a programmable Rydberg simulator." Nature 568.7751 (2019): 207-211.

Supplementary European Search Report issued in counterpart European Patent Application No. 20837003.1, Jun. 26, 2023, 9 pages.

Poddubny, A. N., & Glazov, M. M. (2019). Topological spin phases of trapped Rydberg excitons in $Cu_2O$. arxiv.org, Cornell University Library Ithaca, NY 14853, Mar. 28, 2019.

Bloch, I. (2005). Ultracold quantum gases in optical lattices. Nature Physics, 1(1), 23-30.

Laycock, T., et al. (2011). Creation of collective many-body states and single photons from two-dimensional Rydberg lattice gases. arxiv.org, Cornell University Library Ithaca, NY 14853, Feb. 10, 2011, doi: 10.1088/0953-4075/44/18/184017.

Saffman, M. et al., " Quantum information with Rydberg atoms", arXiv.org, v3, pp. 1-51, May 12, 2010, retrieved from https://arxiv.org/abs/0909.4777.

Weimer, H. et al., "A Rydberg Quantum Simulator", arXiv.org, v2, pp. 1-10, Apr. 9, 2012, retrieved from https://arxiv.org/abs/0907.1657.

\* cited by examiner

RYDBERG EXCITON QUANTUM SIMULATOR

FIELD

The present disclosure relates to quantum computing, more particularly it relates to a solid-state quantum simulator.

BACKGROUND

Quantum information processors have the potential to perform computational tasks that are difficult or impossible using conventional modes of computing. The standard approach to quantum computation is predicated on the quantum bit ("qubit") model in which one anticipates computing on a local degree of freedom such as a nuclear spin. In a qubit register, each bit of information is typically encoded in the state of a single particle, such as an electron or photon.

The existing approaches to quantum computing rely on different physical systems include trapped ions, superconducting qubits, and solid-state spin qubits, and trapped neutral atoms. In the approach based on individually trapped atoms, the total number of atoms that can be individually trapped is a technical challenge. The current published results show up to 51 individual atoms trapped in a linear geometry, in which two-dimensional arrays are also possible but still limiting for many applications. The switching speeds of these systems are limited by the radiative decay rate of the Rydberg states of these atoms, and the atomic qubit switching speeds (1-100 µs) are generally much slower than that of solid-state devices (1-100 ns).

In addition, in the trapped ion implementation scaling of trapped-ion Coulomb gates becomes difficult when large numbers of ions participate in the collective motion for several reasons: laser-cooling becomes inefficient, the ions become more susceptible to noisy electric fields and decoherence of the motional modes, and the densely packed motional spectrum can potentially degrade quantum gates through mode crosstalk and nonlinearities.

SUMMARY

In one implementation, there is provided a quantum simulation method for solving a computational problem with a solid-state quantum system, the method comprising the steps of:
  passing a laser through a material;
  in the material, evolving at least some of a plurality of atoms in the first state into at least some of a plurality of atoms in a second state upon receiving energy from the laser to form at least one exciton;
  selecting at least one exciton site on the material wherein the at least one exciton site is separated from a neighbouring at least one exciton site by a distance less than a Rydberg blockade radius;
  mapping the computational problem into a problem Hamiltonian of the quantum system, wherein the problem Hamiltonian is a Hamiltonian comprising a plurality of adjustable parameters;
  measuring at least a portion of plurality of the at least one excitons to obtain a read-out of the solid-state quantum system; and
  determining a solution to the computational problem from the read-out.

In another implementation, there is provided a quantum computer simulator system for solving a computational problem, the quantum simulator system comprising:
  a laser source for emitting a laser beam;
  a material for receiving the laser beam;
  an amplitude modulator and frequency modulator for manipulating the laser beam for desired characteristics;
  a beam splitter for splitting the laser beam to form a plurality of split lasers beams directed at predetermined locations on the material;
  a photodetector for detecting photon energy generated by recombination of an electron-hole pair forming an exciton to restore an atom in the material; and
  a quantum calculation result read-out unit coupled to the photodetector for determining a solution to the computational problem.

The quantum simulator methods and systems in the present disclosure are based on Rydberg states of excitons in certain semiconductors, such as cuprous oxide ($Cu_2O$), and the high-flying Rydberg states of excitons and their characteristic Rydberg blockade effect have several advantages over the prior art methods and systems, such as the trapped atom quantum simulator. One of the advantages is that since the excitons are quasi-particles and are localized by the driving laser field, then individual trapping of atom is not required. In addition, positioning is not restricted to a grid, and excitons can be addressed in any arrangements to any extent permitted by optical focusing. Another advantage is that the lifetime of Rydberg excitons are orders of magnitude shorter than trapped atoms, which enables operations and read-out at rates that are orders of magnitude faster than their atomic counterpart. In the realm of quantum information processing, Rydberg excitons are proposed sources of single photons and are useful in building quantum logic gates to perform certain unitary operations that act on sets of qubits, such as a controlled-NOT operation on two qubits. This system can be used to simulate interacting many-body systems, and the quantum simulator can be directly adopted to solve the maximum independent set (MIS) problem. Such a problem is characterised as having non-deterministic polynomial-time hardness property (or NP-hard) in graph theory, meaning that when using conventional computers the total number of resources find a solution scales exponentially with the size of the problem.

Accordingly, aspects of the quantum simulator methods and systems in the present disclosure offer an alternative approach that relies on the same physics governing the trapped neutral atoms but its implementation is in a solid-state system that circumvents challenges regarding trapping of many individual atoms and operates at rates that are orders of magnitude faster than the atomic system.

BRIEF DESCRIPTION OF THE DRAWINGS

The detailed description refers to the drawings briefly described below.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the disclosure. Like reference numerals are used to designate like parts in the accompanying drawings.

The detailed description provided below in connection with the appended drawings is intended as a description of the present examples and is not intended to represent the only forms in which the present example may be constructed or used. However, the same or equivalent functions and sequences may be accomplished by different examples.

Figure 1A:
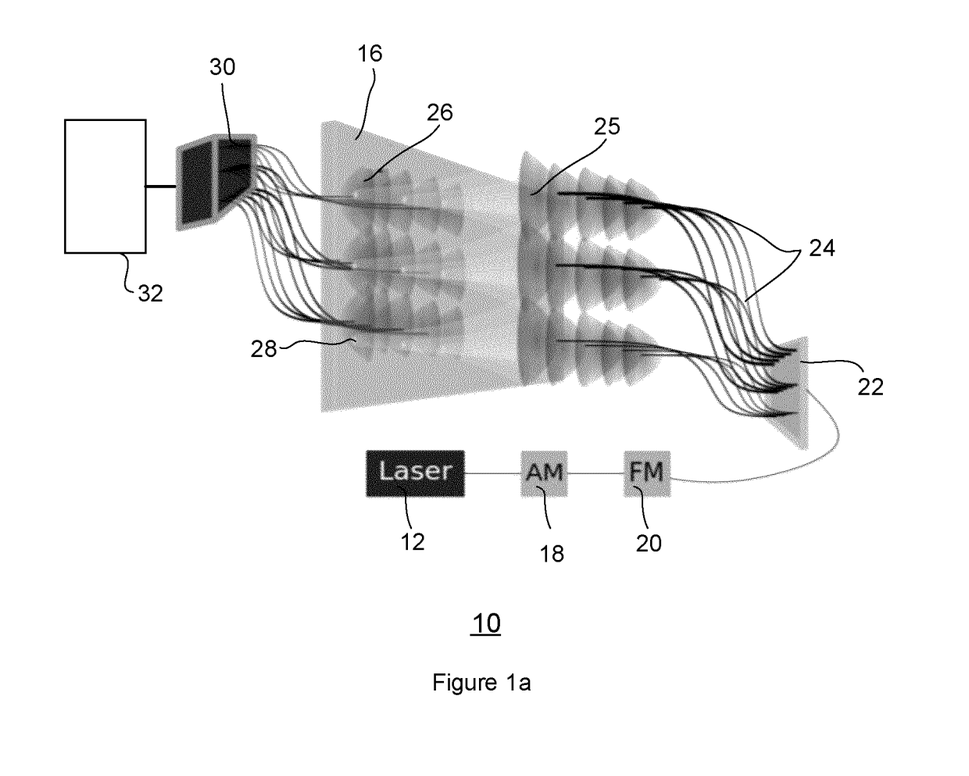
FIG. 1a shows an experimental setup and protocol for a quantum simulator.

FIG. 1a shows an experimental setup and protocol for a quantum simulator, designated by reference numeral 10. Quantum simulator 10, such as the one for solving quantum computational problems, comprises laser source 12 which emits a laser and aimed at material 16. Amplitude modulator 18 and frequency modulator 20 generate both amplitude (AM) modulations and optical frequency (FM) of the laser beam. Beam splitter 22 splits the laser beam into a plurality of optical fibers 24 to form corresponding laser beams 25 which are focussed at different locations 26 on material 16. Upon receiving the laser radiation, some of the atoms of material 16 are caused to transition from a ground state to an excited state to form quasi-particles 28, or bound excitons. In the process, the electron-hole pair forming the exciton can later recombine to emit a photon which is then detected by photodetector 30, such as a photon counting imager, coupled to quantum calculation result read-out unit 32 which associates the state of each qubit.

Figure 1B:
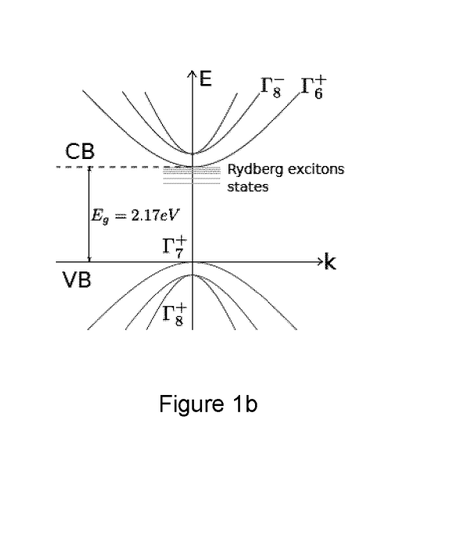
FIG. 1b shows $Cu_2O$ Rydberg exciton states.
Figure 1C:
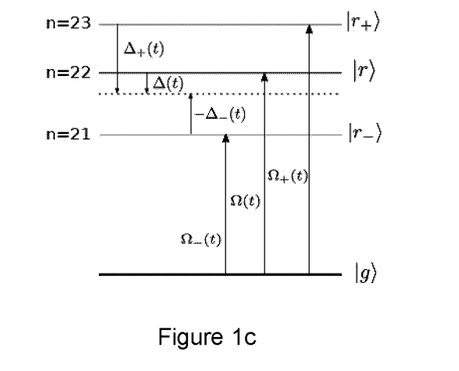
FIG. 1c shows a diagram of the level structure for a single exciton.
Figure 1D:
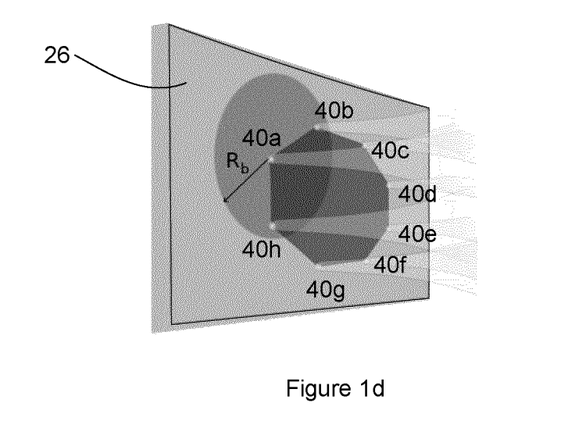
FIG. 1d shows exciton site positions in a polygonal configuration.
Figure 1E:
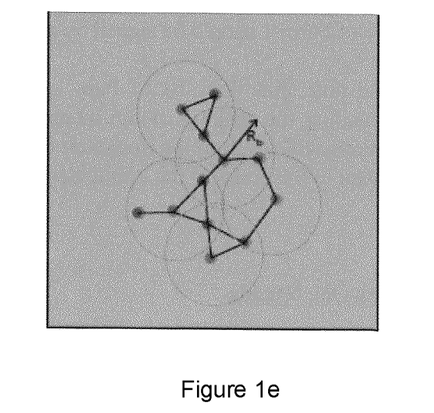
FIG. 1e shows unit disk (UD) graphs comprising geometric graphs.

Now referring to FIG. 1b, there is shown a schematic of cuprous oxide ($Cu_2O$) Rydberg exciton states, and FIG. 1c shows a diagram of the level structure for a single exciton in the case of two Rydberg levels, namely the n=22, and n=23 states. FIG. 1d shows a plurality of exciton site positions arranged in a polygonal configuration. As an example, laser beams 25 are directed at predetermined coordinates 40a-h of exciton sites 26 on the material 16, to selectively generate excitons at those locations. In one implementation, to generate a desired exciton ensemble, the distance between any neighboring exciton sites, e.g. 40a and 40h, is chosen to be less than the blockade radius ($R_b$), as will be described later. FIG. 1e shows unit disk (UD) graphs comprising geometric graphs, where vertices are placed in the 2D plane and connected if their pairwise distance is less than the blockade radius ($R_b$). The maximum independent set problem on unit disk graphs (UD-MIS) is still NP-complete, as will be described in more detail later.

Figure 2:
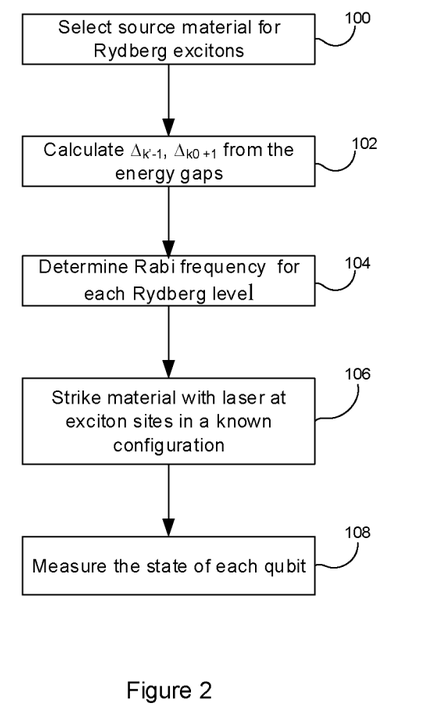
FIG. 2 shows a flowchart comprising exemplary steps for solving a computational problem with a solid-state quantum system using Rydberg excitons.

Looking at FIG. 2, there is shown a flowchart outlining exemplary steps for computing a solution to a computational problem using a solid-state quantum system using Ryberg excitons. In step 100, a cuprous oxide ($Cu_2O$) crystal 16 was chosen as a material for excitation by laser beam 25, and $Cu_2O$ excitons were modelled using a 4-level system i.e. 1 ground level and 3 Rydberg levels, as shown in FIGS. 1b and 1c. It is known that for Rydberg levels within the strong interaction regime, specifically n=22, the energy gaps between n=22 and the adjacent Rydberg levels are relatively small. Rydberg levels (n=23) above the n=22 level is 25 GHz, while below the n=22 level is 29 GHz. The excitons were driven with kth Rydberg state and ground coupled Rabi frequency $\Omega_k(t)$, and detuning $\Delta_k(t)$, and interaction potential is modeled by the principal number dependent van der Waals interaction:

$$\left(V_{k_{ij}} = \frac{C_k}{R_{ij}^b}\right).$$

The quantum computer performs definition and control of quantum bits based on Hamiltonian (motion equation) indicated by the following expression:

$$\frac{H}{\hbar} = \sum_{k,i} \frac{\Omega_k(t)}{2}(\sigma_i^k) - \sum_{k,i} \Delta_k(t) n_i^k + \sum_{k,i>j} V_{k_{ij}} n_i^k n_j^k$$

Where $|g_i\rangle$ and $r_i^k\rangle$ represent the ith atom's ground state or kth Rydberg level respectively. $\sigma_i^k = |r_i^k\rangle\langle g_i| + |g_i\rangle\langle r_i^k|$, $n_i^k = |r_i^k\rangle\langle r_i^k|$, and $V_{ij}$ is the interaction potential between atoms i and j.

In step 102, using a reference Rydberg state's detuning, the other adjacent $\Delta_{k'-1}$, $\Delta_{k0+1}$ were calculated from the energy gaps. Thus given k' as a reference level, $R_y$ (the Rydberg constant) and $\delta_p$ (the quantum defect), $\Delta k(t)$ was calculated using the following formula:

$$\Delta_k(t) = \Delta_{k'}(t) + \frac{R_y}{(k' - \delta_p)^2} - \frac{R_y}{(k - \delta_p)^2}$$

Similarly, in step 104 the Rabi frequency was determined for each Rydberg level by using a set Rabi frequency and the relative transition dipole moments (k), given a reference k':

$$\Omega_k(t) = \sqrt{\frac{\mu_k}{\mu_{k'}}} \Omega_{k'}(t)$$

In the exemplary model, the reference k' is n=22, for all parameters, and the Rabi frequency was constant in time and space $\Omega_k(t)=\Omega_k$ with $\Omega=14.81$ GHz, while $\Delta(t)$ was a time dependent and iteratively optimized to maximize the probability of a selected objective state(s), as will be described later.

Next, laser beam 25 was caused to strike a set of locations 40a-h, or exciton sites, on the material 26, arranged in a known configuration, such as a polygon, step 106. For Rydberg excitons in cuprous oxide, $Cu_2O$, with principal quantum numbers as large as n=25, these states have wave function extensions of more than 2 micrometers, compared to about a nanometer for the ground state. The strong dipole-dipole interaction is evidenced by a blockade effect, where the presence of an exciton prevents excitation of a further exciton in its vicinity. $Cu_2O$ has a direct band gap, and the highest valence and the lowest conduction bands are formed from Cu-states, namely the $3d$ and $4s$ orbitals, respectively. Therefore, photon absorption leads to electron-hole pair creation at the same atom, different from the vast majority of other direct-gap semiconductors like GaAs for which conduction and valence band originate from the levels of different atoms. The blockade arises from the dipole-dipole interactions between Rydberg excitons, depending strongly on their separation. If an exciton is created, the resonant frequency for exciting another exciton nearby is changed by the Rydberg interaction energy, away from the narrow undisturbed absorption line.

The edge length of this polygon (i.e. the nearest neighbor distance) was a factor of the blockade radius, that is the distance between the exciton sites such that $V_{ij}=\Omega$, or more directly $$R_b = \sqrt[6]{\frac{C}{V_{ij}}}.$$

Figure 3A:
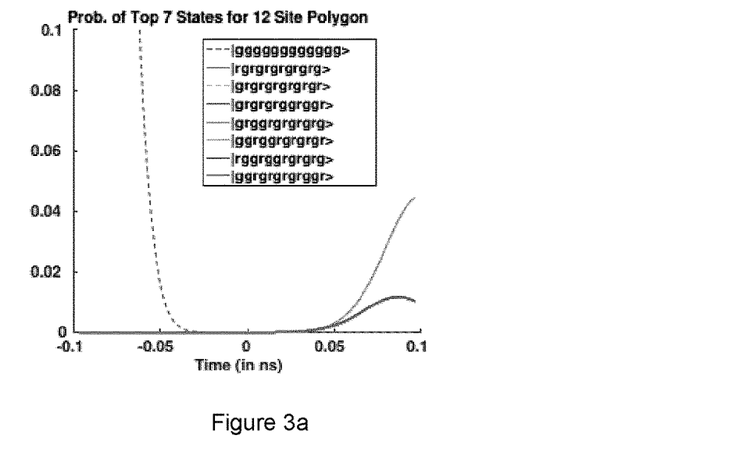
FIG. 3a shows probabilities for the top 8 most probable ensemble states, for 12 exciton sites placed within a polygon shape.

In one example, the distance was chosen to be about $0.74*R_b=2.9157$ μm. By having the exciton sites 40a-h separated by this distance, the nearest neighbors have $V_{kij}>>\Omega_k$, while second nearest neighbor have $\Omega_k>>V_{kij}$. This effect, referred to as Rydberg blockade, blocks nearest neighbors from becoming excited, as shown in FIG. 2b, such that an ordered objective state(s) is/are obtained. For any shape the objective state(s) refers to the state(s) with the maximum number of excitations that can occur without any nearest neighbors being excited, step 108. The limiting factor in creating these states lies in the relatively large line width, as will be described later, and the power broadening caused by the relatively small gaps between n=21, 22 and 23 levels. These gaps limit the range of $\Omega$ that can be used, and therefore in order to generate the objective state, excitations into higher/lower Rydberg levels are minimized by setting $\Delta_k$ to be greater than $\Omega_k$ for k≠22. In one exemplary implementation, for a 12 exciton site polygon comprising two states |rgrgrgrgrgrg⟩ and |grgrgrgrgrgr⟩, the state probabilities were calculated over time, and these states were found to be the most probable, with a final probability of 0.04451 each, as shown in FIG. 3a. Furthermore, a second order correlation defined as:

$$g_{ij}^{(2)} = \langle n_i n_j \rangle - \langle n_i \rangle \langle n_j \rangle$$

demonstrates this effect.

Figure 3B:
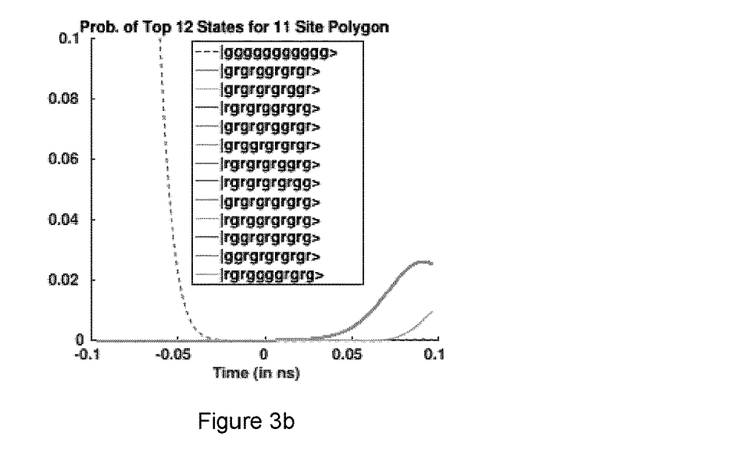
FIG. 3b shows probabilities for the top 12 most probable ensemble states, for 11 exciton sites placed within a polygon shape.

FIG. 3b shows the probabilities for the top 12 most probable ensemble states, for 11 exciton sites arranged in a polygonal configuration. For this configuration there exists 11 different objective states, all with equal probabilities of P=0.02621.

Figure 3C:
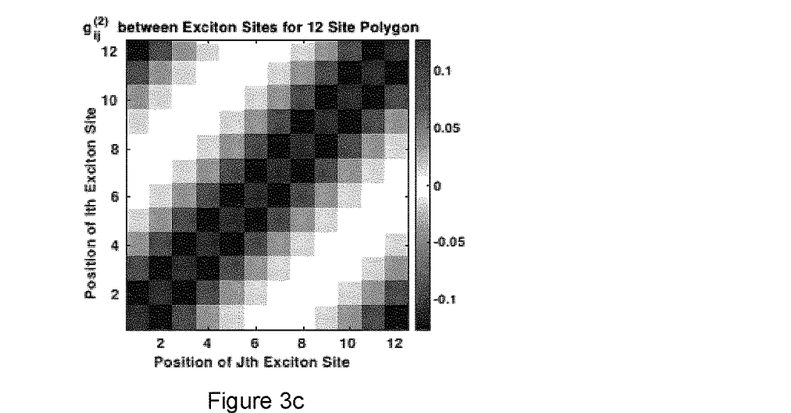
FIG. 3c shows $g_{ij}^{(2)}$ (two-point correlation function) between excitons at specific positions for 12 excitons within a polygonal configuration.

Looking at FIG. 3c, it can be seen that the blockade effect is apparent where a positive value implies correlation while negative value implies anti-correlation, the cyclic nature of the $g_{ij}^{(2)}$ is a result of the polygon geometry, such that exciton site 1, 2 and 12 are the same. $g_{ij}^{(2)}$ between excitons at specific positions for 12 excitons within a polygon configuration. Exciton sites neighboring each other, due to the blockade's effect, are anti-correlated, and those sites that are an odd distance apart are correlated. However, while a strong pattern is discernible for the nearest neighbors and the second nearest neighbors, the pattern peters out sharply as one gets further.

Generally, the ensemble state decays at a rate proportional to the number of excited sites in the objective state, and for given a connected ensemble, the worst possible decay rate is proportional to half the size of the ensemble. For fewer Rydberg excitations in the objective state the effect of decay diminishes until the point of being negligible. The simulations were run for timescales significantly lower than the lifetime of the Rydberg states, and moreover the probability of the objective state was low at the beginning of the time scale, thus making the actual relevant time scale unclear. However, higher probabilities using a larger time scales may be achieved by deducing a range for the number of |r⟩ sites in the objective state. Even without decay, the probability of the objective state decreases with more sites. For example, for a polygon of 4, 6, 8, 10, and 12, exciton sites probabilities of 0.2539, 0.1385, 0.08595, 0.07415, 0.04451 were achieved respectively. Assuming an exponential distribution, an approximate probability for the objective state for higher numbers of sites can be determined. For instance without decay, the 50 exciton site polygon is expected to have a probability for the objective state on the scale of $P=2*10^{-5\pm0.4}$, [4.461E–5, 7.217E –6].

In yet another exemplary implementation, $\Delta(t)$ is optimized for higher exciton numbers with a known site configuration and objective state, and subsequently that function is employed for arbitrary unknown configurations. The probability of achieving this objective state represents the probability of finding a particular solution to a trivial maximum independent set problem, since the maximum independent set problem, after being mapped, is equivalent to finding the objective state. For instance, in the 12-sided polygon either of |grgrgrgrgrgr⟩ or |rgrgrgrgrgrg⟩ are maximum independent sets, the probability of obtaining a maximum independent set is 9%, therefore in order to achieve a 95% chance of the objective state occurring, about 32 runs would need to be made.

Figure 4A:
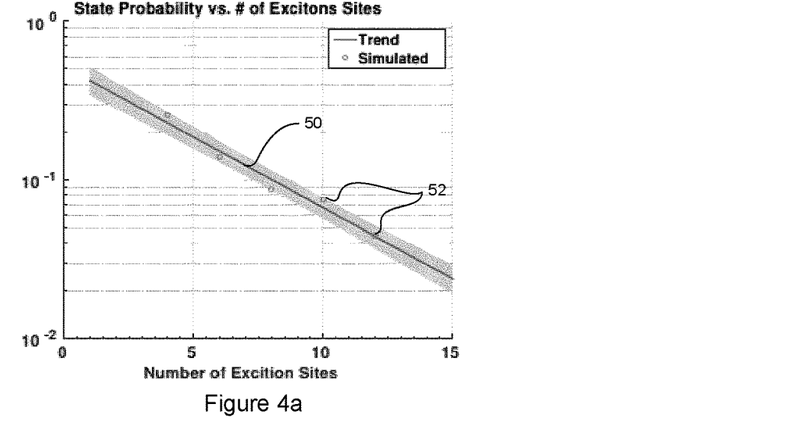
FIG. 4a shows state probability of the objective state for a polygonal configuration of different number of exciton sites.

FIG. 4a shows the probability of an objective state for a polygonal configuration with different number of exciton sites. The scaling can be modelled with an exponential decay as shown by solid line 50, and dots 52 represent the simulated state probability for a chosen number of exciton sites. Accordingly, the state probability for a 50 exciton site configuration can be predicted by extrapolation.

Figure 4B:
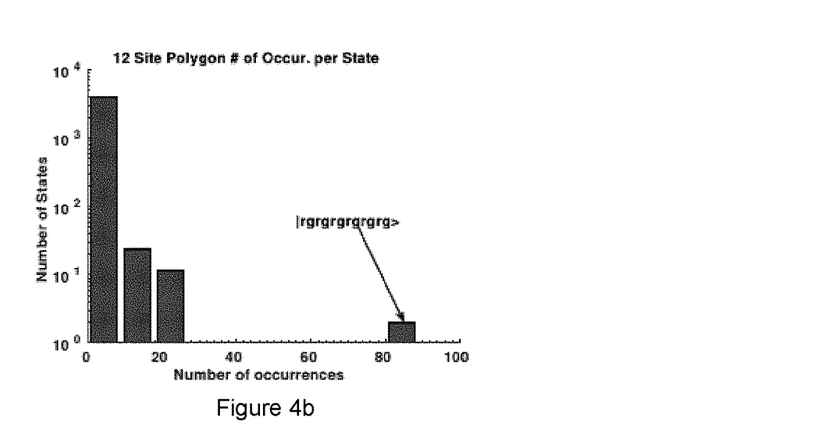
FIG. 4b shows distribution of states based on the number of times the ensemble states can be expected to occur after 2,000 runs, for a 12 exciton site polygon.
Figure 4C:
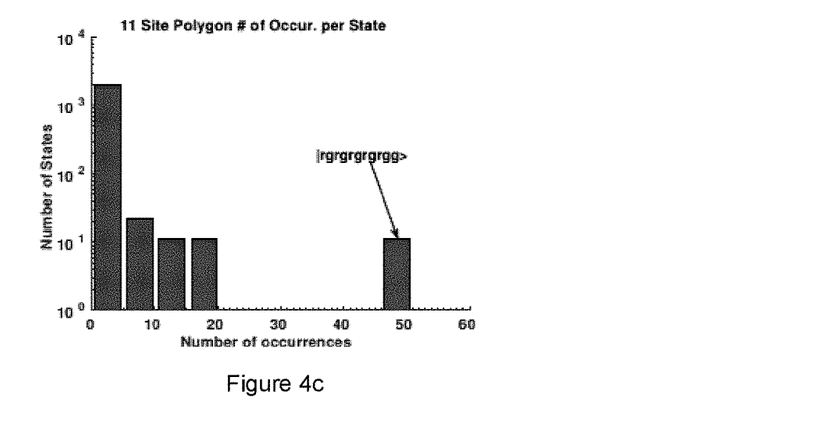
FIG. 4c shows distribution of states for 2,000 runs for a 11 exciton site polygon.

FIG. 4b shows the distribution of states based on the number of times these objective states can be expected to occur after 2,000 runs, for a 12 exciton site polygon, and the two objective states are expected to occur far more than any other states. FIG. 4c shows the distribution of states for 2,000 runs for a 11 exciton site polygon. Since there are 11 equally equivalent objective states, there should be 11 states which are expected to occur significantly more than any other state.

As stated above, the quantum computing method and system may be used to solve independent set problems on unit disk graphs. Generally, unit disk graphs consist of a series of vertices on a Cartesian grid such that if any point is within a unit disk centered on another vertex (i.e. the distance between them is less than 1), then these points are categorized as neighbors. It is in general possible to map a unit disk graph to an exciton site configuration, allowing one to then solve the maximum independent set problem. This is achievable by locating exciton sites that are connected at a distance such that they are within the Rydberg blockade radius of another, as described above. The blockade effect, directly lends itself to finding a maximum independent set, which is more properly defined as to determine the maximum number of vertices, and which, can be colored such that no 'neighboring' vertices are colored. In the exciton site, the colored vertices are mapped to those exciton sites that are in the $|r\rangle$ level.

In general, the algorithm for solving these problems entails a single experiment run that outputs the maximum independent set and a sufficient number of runs to achieve a high enough confidence such that there is no larger independent set. Accordingly, the gaps between the probability of achieving the maximum independent set and the second most independent set is immaterial, since it can easily be discerned linearly with a larger set. While it possible that a larger, an 'invalid' set (i.e. two neighboring excitons both in Rydberg state) could be outputted, the probability of this is low, and it can be determined whether any new 'partial maximum' is a 'valid' set in polynomial time.

Figure 5A:
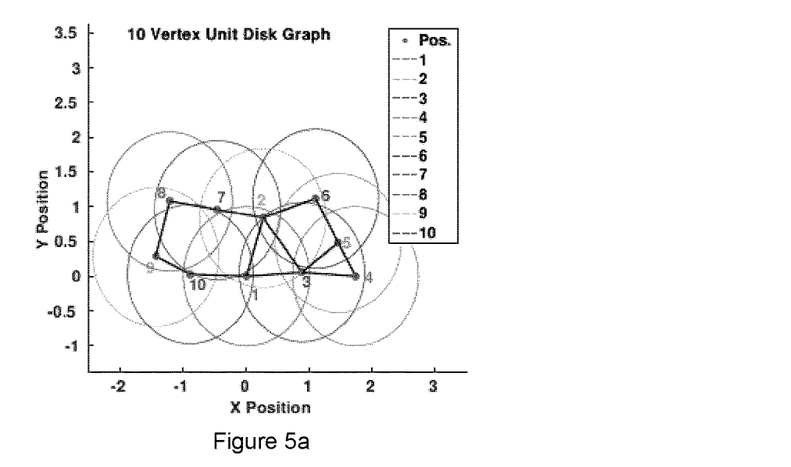
FIG. 5a shows a unit disk graph for the 10 exciton site.

As an example, looking at FIG. 5a, there is shown a 10 unit disk graph with a maximum independent set (MIS) state where vertices 1, 4, 6, 7, 9 are selected. This is equivalent, after mapping to the state $|rggrgrrgrg\rangle$. The probability of occurrence for this state occurs is 2%, and therefore a sufficient number of simulations would be run to determine with a certain level of certainty that no larger independent set had a higher probability. Given that there are $2^{10}$ different sets, and the Hilbert space is $4^{10}$, the chance of success of 2% is relatively high. The large Hilbert space of a quantum simulator allows for operations unavailable to classical computers. The functionality becomes even more apparent when one considers larger number of exciton sites.

Figure 5B:
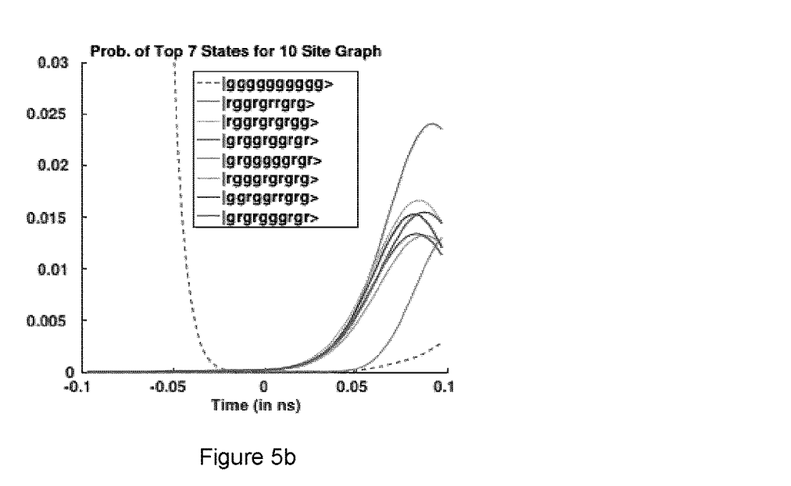
FIG. 5b shows the probabilities over time of achieving different states for the 10 exciton site UD graph.
Figure 5C:
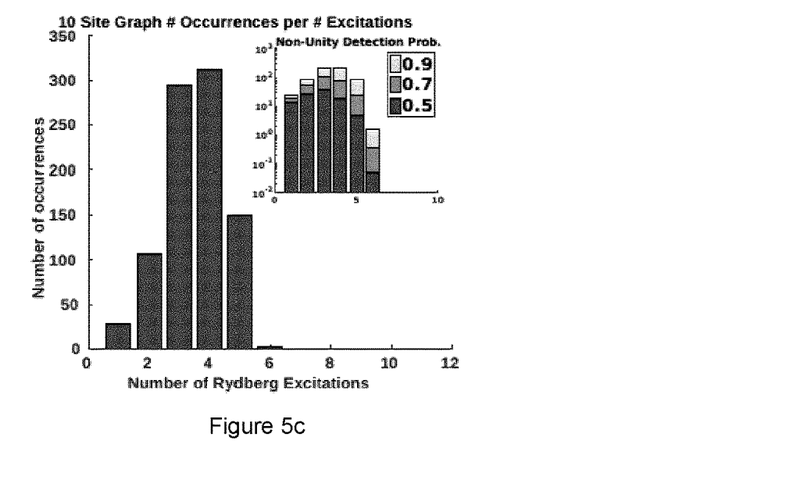
FIG. 5c shows the expected number of occurrences for different amounts of Rydberg excitations, for the 10 exciton site graph.

FIG. 5b shows the probabilities over time of achieving different states for the 10 exciton UD graph. The probability of achieving the MIS state $|rggrgrgrgr\rangle$ was found to be P=0.02353. FIG. 5c shows the expected number of occurrences for different amounts of Rydberg excitations, for a 10 exciton site graph, based on 2,000 runs. The inlay graph shows the expected number of detections given non-unitary detection probabilities of 0.5, 0.7, and 0.9.

As previously discussed, the gaps between Rydberg levels, relative to the lifetime limits the probability of achieving the objective state on each run. Advantageously, this small lifetime allows computations to be run at orders of magnitude faster than individually trapped Rydberg atoms. Operating on orders of nanoseconds instead of 100 µs allows for the performance of a large number of consecutive simulations, thereby increasing the probability of the objective state being sampled out. In another implementation, the exciton sites are arranged in a predetermined configuration, such as a line. In one example with 12 exciton site line, about 32 runs are made in order to achieve a 95% chance of the correct state occurring.

In another exemplary implementation, micro-structures state is achieved in substantially less runs by modifying the energy level by creating micro-structures carved within the crystal of $Cu_2O$. These micro-structures are able to generate a potential barrier to substantially minimize excitations into higher Rydberg levels and dramatically increase the probability of achieving the objective state.

In another exemplary implementation, at least one optical cavity is used to enhance the laser-induced exciton dipolar transition and photodetection probabilities.

In another exemplary implementation, at least two lasers are used to excite the Rydberg exciton via multi-photon excitation.

In another exemplary implementation, there is provided a material capable of having 100 or more quantum bits per element, and capable of stably maintaining a quantum state during calculation, controlling variation of a quantum state, and achieving large-scale integration of quantum bits. This material is also relatively inexpensive to manufacture.

In another exemplary implementation, any suitable material capable of generating excitons with a substantially high binding energy may be useful in the above-noted method and system. As an example, relatively high binding energy is available in a collection of 2D materials, such as single-walled carbon nanotubes and transition metal dichalcogenaides (TMDCs) comprising tungsten disulfide ($WS_2$), tungsten diselenide ($WSe_2$), molybdenum disulfide ($MoS_2$), and molybdenum diselenide ($MoSe_2$). In addition, these 2D materials may be stacked and still maintain a high binding energy, while modifying other properties, such as exciton lifetime. Accordingly, new semiconductors having these desirable characteristics may be manufactured for the Rydberg exciton quantum simulator.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A quantum simulation method for solving a computational problem using a solid-state quantum system, the method comprising the steps of:
    passing a laser through a material;
    in the material, evolving at least some of a plurality of atoms in a first state into at least some of the plurality of atoms in a second state upon receiving energy from the laser to form at least one exciton;

selecting at least one exciton site on the material wherein the at least one exciton site is separated from a neighbouring at least one exciton site by a distance less than a Rydberg blockade radius;

mapping the computational problem into a problem Hamiltonian of the solid-state quantum system, wherein the problem Hamiltonian is a Hamiltonian comprising a plurality of adjustable parameters;

measuring at least a portion of a plurality of the at least one excitons to obtain a read-out of the solid-state quantum system;

determining a solution to the computational problem from the read-out;

determining a Rydberg frequency for each Rydberg level of the material, and wherein the material is selected from a group comprising materials with a substantially high binding energy for generating excitons, and wherein the material is a 2D material comprising at least one of single-walled carbon nanotubes and transition metal dichalcogenaides (TMDCs).

2. The method of claim 1, wherein each of the at least some of the plurality of atoms is excited at a Rabi frequency ($\Omega_k(t)$).

3. The method of claim 1, wherein the plurality of atoms in the first state comprises between Rydberg levels with principle quantum number of 22 and 23 atoms.

4. The method of claim 1, wherein a first at least one exciton state is less than principle quantum number 23 or more than principle quantum number of 23.

5. The method of claim 1, wherein the computational problem is a maximum independent set problem.

6. The method of claim 5, wherein the maximum independent set problem is on a unit disk graph, and wherein the unit disk graph is mapped to an exciton site configuration by locating exciton sites that are separated from each other by a distance less than a Rydberg blockade radius.

7. The method of claim 1, wherein the transition metal dichalcogenaides (TMDCs) comprises at least one of tungsten disulfide ($WS_2$), tungsten diselenide ($WSe_2$), molybdenum disulfide ($MoS_2$), and molybdenum diselenide ($MoSe_2$).

8. The method of claim 1, wherein gaps between the Rydberg levels relative to the exciton lifetime dictate the probability of achieving an objective state.

9. The method of claim 8, comprising a further step of minimizing excitations into higher/lower Rydberg levels in order to increase the probability of achieving the objective state.

10. The method of claim 9, wherein for gaps between n=21, 22 and 23 levels $\Delta_k$ is set to be greater than $\Omega_k$ for k≠22.

11. The method of claim 1, wherein the solution to the computational problem is determined at switching speeds in the range of about 1 to 100 nanoseconds.

12. The method of claim 1, wherein at least one optical cavity is used to enhance laser-induced exciton dipolar transition and photodetection probabilities.

13. A quantum simulator system for solving a computational problem, the quantum simulator system comprising:
a laser source for emitting a laser beam;
a material for receiving the laser beam;
an amplitude modulator and frequency modulator for manipulating the laser beam for desired characteristics;
a beam splitter for splitting the laser beam to form a plurality of split lasers beams directed at predetermined locations on the material;
a photodetector for detecting photon energy generated by recombination of an electron-hole pair forming an exciton to restore an atom in the material; and
a quantum calculation result read-out unit coupled to the photodetector for determining a solution to the computational problem.

14. The system of claim 13, wherein the predetermined locations are sites with the excitons.

15. The system of claim 14, wherein the exciton sites are arranged in a predetermined configuration.

16. The system of claim 15, wherein at least one ordered objective state is based on the maximum number of excitations that can occur without any nearest neighboring exciton site being excited.

17. The system of claim 16, wherein the exciton sites are separated from each other by a distance less than a Rydberg blockade radius.

18. The system of claim 17, wherein the computational problem is a maximum independent set problem.

19. The system of claim 18, wherein the maximum independent set problem is on a unit disk graph, and wherein the unit disk graph is mapped to the predetermined configuration of the exciton sites.

20. The system of claim 19, wherein the probability of at least one ordered objective state depends on at least detuning $\Delta(t)$, and detuning $\Delta(t)$ is iteratively optimized to maximize the probability of the at least one ordered objective state.

21. The system of claim 13, wherein the material is selected from a group comprising materials with a substantially high binding energy for generating excitons.

22. The system of claim 21, wherein the material comprises micro-structures, and wherein the micro-structures minimize excitations into higher Rydberg levels, thereby increasing the probability of achieving the objective state.

23. The system of claim 21, wherein the material is at least one of cuprous oxide and a 2D material.

24. The system of claim 23, wherein the 2D material comprises single-walled carbon nanotubes and transition metal dichalcogenaides (TMDCs).

25. The system of claim 24, wherein the transition metal dichalcogenaides (TMDCs) comprises at least one of tungsten disulfide ($WS_2$), tungsten diselenide ($WSe_2$), molybdenum disulfide ($MoS_2$), and molybdenum diselenide ($MoSe_2$).

26. The system of claim 13, wherein the solution to the computational problem is determined at switching speeds in the range of about 1 to 100 nanoseconds.

* * * * *